United States Patent [19]

Wilkinson et al.

[11] 4,239,676

[45] Dec. 16, 1980

[54] COATING COMPOSITIONS COMPRISING POLYMER BLENDS

[75] Inventors: Walter J. Wilkinson, Wilbraham; Irving Serlin, Springfield, both of Mass.

[73] Assignee: Monsanto Company, St. Louis, Mo.

[21] Appl. No.: 38,048

[22] Filed: May 11, 1979

[51] Int. Cl.$^3$ .................. C08K 3/36; C08L 61/28
[52] U.S. Cl. .................. 260/39 P; 428/511; 525/57; 525/155
[58] Field of Search .................. 525/57, 58, 155, 206; 428/511; 260/39 P

[56] References Cited

U.S. PATENT DOCUMENTS

| | | | |
|---|---|---|---|
| 2,697,086 | 12/1954 | Lindenfelser et al. | 260/29.4 |
| 3,282,865 | 11/1966 | Spencer | 525/58 |
| 3,639,640 | 2/1972 | Gaber | 117/224 |
| 3,869,305 | 3/1975 | Eiland | 117/66 |
| 3,991,253 | 11/1976 | Markhart et al. | 428/325 |
| 4,062,681 | 12/1977 | Lewis et al. | 96/1.5 N |

*Primary Examiner*—Theodore E. Pertilla
*Attorney, Agent, or Firm*—R. Bruce Blance; William J. Farrington; Edward P. Grattan

[57] ABSTRACT

Coating compositions comprising intimate blends of a polyvinyl acetal, an alkoxymethyl polyaminotriazine and an oligomeric polystyrene or poly($\alpha$-methylstyrene). The coating compositions may contain up to 500 parts by weight of an inert non-photoconductive pigment per 100 parts by weight of polymer blend. The compositions are useful for the preparation of electrographic recording media which possess improved resistance to curl under variable conditions of humidity.

10 Claims, No Drawings

COATING COMPOSITIONS COMPRISING POLYMER BLENDS

This invention relates to a coating composition adapted for use in the preparation of electrographic recording materials.

In general electrographic recording processes involve forming a latent image upon an electrically insulating charge-retentive layer of an electrographic recording material by impressing an electric charge corresponding to an original pattern and treating or developing the latent image by applying to the charge-retentive layer a colored resinous powder or toner which clings to the charged areas but which does not adhere to the uncharged areas. The developed image is then fixed by application of heat and/or pressure to the electrographic recording material to fuse the toner particles to the charge-retentive layer and form a permanent visible image. The electrographic recording material comprises an electroconductive sheet support coated with the electrically insulating charge-retentive layer comprising an electrically insulating polymeric binder and optionally a pigment or filler. The sheet support is generally paper which has been treated with ionic salts or polymers to provide electroconductivity.

Poly(vinyl acetals) such as poly(vinyl butyrals) have been found to be suitable as the electrically insulating polymeric binder because their ready acceptance and retention of a high level of electrostatic charge allows crisp, high density images with clean backgrounds to be formed on their surface. However, the high glass transition temperature of these poly(vinyl acetals) can create a curling problem in electrographic recording materials in which the poly(vinyl acetals) form the electrically insulating charge-retentive layer especially when the electrographic recording materials are subjected to variable conditions of humidity. The curl tendency is highly undesirable since it can cause feeding and jamming problems in copy machines. The tendency can be reduced by plasticizing the poly(vinyl acetal) but loss in density of the developed image and decrease in toner retention accompanies such plasticization.

In the preparation of electrographic recording materials, the poly(vinyl acetals) are generally applied in solution in suitable organic solvents to the electroconductive paper support. Another disadvantage of the poly(vinyl acetals) resides in the high viscosity of their solutions which limits their useful molecular weight or requires that they be applied as relatively dilute solutions to the paper support. Consequently, the coating process can be wasteful of solvent and energy required to drive off the solvent.

SUMMARY OF THE INVENTION

According to the present invention, there is provided a coating composition adapted for use in the preparation of electrographic recording material, comprising an intimate blend of from about 50 to about 90 parts by weight of a poly(vinyl acetal), from about 5 to about 40 parts by weight of an alkoxymethyl polyaminotriazine and from about 5 to about 30 parts by weight of an oligomeric polystyrene or poly($\alpha$-methylstyrene). The coating composition is supplied in organic solvent solutions which can be applied to an electroconductive paper support and dried to give electrographic recording materials of improved curl resistance without loss of print density or toner retention when the developed recording material is subjected to an adhesion test.

DESCRIPTION OF THE PREFERRED EMBODIMENTS

The poly(vinyl acetals) useful in the present invention are actually interpolymers of a vinyl acetal, a $C_4$–$C_{10}$ vinyl carboxylate and vinyl alcohol, of weight average molecular weight in the range of about 20,000 to about 500,000, comprising less than about 30 weight percent interpolymerized vinyl carboxylate units and from about 5 to about 21 weight percent of interpolymerized vinyl alcohol units. The preferred vinyl carboxylate is vinyl acetate. Particularly preferred poly(vinyl acetals) comprise from about 9 to about 18 weight percent of vinyl alcohol units and have a molecular weight in the range of about 25,000 to about 250,000. Among the preferred poly(vinyl acetals) are those wherein the cyclic vinyl acetal units are derived from formaldehyde, acetaldehyde, propionaldehyde or butyraldehyde. Poly(vinyl butyrals) are especially preferred.

The second component of the coating composition is selected from the group consisting of alkoxymethyl polyaminotriazines obtained by substantial methylolation of a polyaminotriazine, followed by substantial etherification with a $C_1$ to $C_{10}$ alcohol. Suitable polyaminotriazines contain at least two amino groups per triazine ring and include formoguanamine, acetoguanamine, benzoguanamine, melamine and the like. They are reacted with formaldehyde to methylolate the amino groups and are then alkylated or etherified by reaction with the $C_1$ to $C_{10}$ alcohol or mixture of alcohols to provide unmixed or mixed ethers. These alkoxymethyl polyaminotriazines can be prepared by methods well known in the art. They are essentially monomeric or at most are oligomeric with an average degree of polymerization of no more than about 4, the aminotriazine rings being joined by bridges such as methylene or methylene ether bridges formed by condensation of two methylol groups, and possess a ratio of aminotriazine to combined formaldehyde or degree of methylolation in the range of about 1:n to about 1:2n where n is the number of amino groups per triazine ring and a ratio of aminotriazine to alkyl ether groups or degree of etherification in the range of about 1:0.8n to about 1:2n. The preferred aminotriazine is melamine. The preferred ethers are methyl ethers because they tend to be more completely etherified and lower in viscosity. Thus, the more preferred aminotriazine compounds are the methoxymethyl melamines in which the ratio of melamine to combined formaldehyde is in the range of about 1:5 to 1:6 and the ratio of melamine to methoxy groups is in the range of about 1:4 to 1:6. Among the more preferred aminotriazine compounds is monomeric hexamethoxymethyl melamine. It is believed that the alkoxymethyl polyaminotriazines improve the curl resistance of papers coated with the coating composition of the present invention by increasing the moisture absorption of the coating under conditions of high humidity. However, in startling contrast to other compounds such as glycerol or methoxymethylureas, the improvement in curl resistance is not accompanied by an undesirable loss in the ability of the dielectric coating to retain an electrostatic charge or by a loss in print quality when the electrographic recording material is subjected to an electrographic print test. However, it should be emphasized that although the poly(vinyl acetal) contains a quite considerable amount of hydroxyl, the alkoxymethylmelamine does not interact with the poly(vinyl acetal) to form a crosslinked or thermoset coating and hence does not act in the conventional manner of an aminoplast crosslinker. The lack of thermoset structure can be demonstrated by the ready redispersion of the dried coating composition in a solvent for the poly(vinyl acetal) and is explained by the relatively mild conditions of drying to which the coating is subjected after it has been applied to the paper support.

The third component of the coating composition is an oligomeric polystyrene or poly(α-methylstyrene) of molecular weight in the range of about 300 to 500, which helps to improve coating flexibility, curl resistance of papers coated with the coating composition and image density at high humidity when the coated papers are subjected to an electrographic print test.

The components of the coating composition are blended in the weight ratio of from about 50 to about 90 parts of poly(vinyl acetal), from about 5 to about 40 parts of alkoxymethyl polyaminotriazine and from about 5 to about 30 parts by weight of oligomeric polystyrene or poly(α-methylstyrene). The total amount of alkoxymethyl polyaminotriazine and oligomeric polystyrene or poly(α-methylstyrene) is preferably selected to provide a glass transition temperature in the dry binder composition in the range of about 25° to about 40° C. as measured by differential scanning calorimetry using a duPont Differential Thermal Analyzer Model 900 operated at a heating rate of 20° C. per minute, and to provide an electrographic recording material by coating an electroconductive paper support with the binder composition, which upon exposure to an electrostatic charge pattern and development yields an image density of at least about 0.8 by the method described herein. The amounts of alkoxymethyl polyaminotriazine and oligomeric polystyrene or poly(α-methylstyrene) are selected so that when the electrically insulating binder composition is coated on the electrically conductive paper support to produce an electrographic recording material, the electrographic recording material resists curling when it is subjected to conditions of high humidity. The curling tendency is determined by placing an 8½×11 inch (21.6×27.7 mm) sheet of the electrographic recording material on a horizontal flat surface in an atmosphere of relative humidity 80±3 percent at a temperature of 22° C. for a period of 16 hours. The coated paper is considered to be curl resistant if the paper remains relatively flat and its edges are no more than 30 mm above the surface at the end of the test.

To provide an electrographic recording material, the coating composition is applied to an electroconductive paper support in the form of a continuous film from organic solvent solution by means generally known in the art, such as by spray, brush, roller, wire-rod, doctor blade, airbrush and wiping techniques. Appropriate organic solvents for the blend include solvents such as the lower alcohols, ketones, and esters and mixtures of such solvents with the lower aliphatic, alicyclic and aromatic hydrocarbons. As is generally known the use of high boiling solvents may prevent adequate drying in the drying oven.

An inert non-photoconductive pigment may be added to the solution. A fine dispersion of the pigment can be obtained by conventional high shear mixing. Afterwards the viscosity can be adjusted e.g. by the addition of solvents. This depends, of course, on the nature of the coating system used. Suitable non-photoconductive pigments are organic as well as inorganic substances such as silica, calcined clay, zinc oxide, zinc sulfide, titanium dioxide, talcum, calcium carbonate, diatomaceous earth, barium sulfate and lithopone. The grain size of the pigments should not exceed about 20 microns and preferably should be less than about 10 microns. Preference is given to pigments having a particle size of at most about 1 micron.

The use of non-photoconductive pigments in coating compositions used to prepare electrographic recording material has many advantages. By the addition of pigments a more economical recording material can be obtained, a mat aspect can be given to the electrographic recording material and "tooth" or ability to be marked or written upon by pen or other marking means is improved. The range of the amounts of pigments is rather large. Depending on the poly(vinyl-acetal) used, the size of the pigment particles, and the intended use, 0.1 to 500 parts of pigment per 100 parts of insulating polymeric binder can be used. In order to obtain the advantages of the pigment, preferably from about 50 to about 200 parts of pigment per 100 parts by weight of polymer blend is used.

The amount or weight of insulating layer in the recording material should be sufficient to provide a uniform coating substantially free of defects which might impair the quality of the image reproduced on the insulating layer. The amount can be in the range of about 2 to about 20 g dry weight per sq.m. of recording material, preferably from about 4 to about 16 g. and even more preferably from about 6 to about 10 g/sq.m. However, smaller amounts may suffice if a sufficient electrostatic charge can be applied without the risk of breakdown. Thicker layers are less favorable because processing difficulties may arise during charging and development of the electrographic recording material.

The electroconductivity of normal paper is rather low, especially when the ambient humidity is low. Therefore, the electroconductivity of the paper support should be enhanced to obtain an appropriate electrographic recording material. This can be accomplished e.g. by the addition of salts such as potassium nitrate and/or conductive polymers to the wood pulp during the paper making. A favorable electroconductivity of the paper can also be obtained by impregnating the paper with solutions of salts and/or conductive polymers. Good results are obtained also with paper carrying on at least one side a conductive layer serving as an intermediate layer between the support and the insulating layer. This conductive layer may be composed of e.g. conductive polymers. Surface resistivity values in the range of about $1 \times 10^7$ to $1 \times 10^{10}$ ohm/sq. for the paper allow a normal charging of the insulating surface. Indeed, it should be taken into account, that the surface resistance values of the insulating layer, when measured in the same way, are normally much higher and will show values of $1 \times 10^{11}$ to $1 \times 10^{14}$ ohm/sq. or even more.

The electrographic recording material prepared from the coating compositions of the present invention can be used in an electrostatic printing apparatus wherein an electrostatic charge pattern is built up on the insulating layer by conventional means such as by moving the material in close contact with electroconductive styli or by transferring an electrostatic charge pattern from a photoconductive drum. The electrostatic latent charge pattern formed on the insulating layer can be developed according to techniques known in the art, e.g. by means of a two-component developer composed of a toner and a carrier material or by liquid electrophoretic development. The developed pattern is then made permanent or fixed by application of heat or pressure to fuse the toner to the insulating layer.

The invention is further described and illustrated in the following examples which should not be construed as limiting its scope. All parts and percentages are by weight unless otherwise indicated.

EXAMPLE 1

A uniform blend of a calcined clay sold by Englehard Minerals and Chemicals Division under the tradename Ansilex, a poly(vinyl butyral) characterized by a vinyl acetate content of 1.5 percent, a hydroxyl content of 12 percent and a weight average molecular weight of 50,000 dissolved in a solvent blend of toluene and ethanol and an ethanol solution of methoxymethylmelamine in which the ratio of melamine, formaldehyde and methyl alcohol is 1:5.6:5.3, is prepared by mixing the ingredients in a high speed explosion proof blender. The weight ratio of calcined clay, poly(vinyl butyral), methoxymethylmelamine, toluene and ethanol is 12:0.96:0.24:14.88:1.92. The blend is further mixed with an additional quantity of poly(vinyl-butyral), methoxymethylmelamine, a liquid polystyrene of molecular weight about 300, sold by Hercules Powder Co. under the tradename of Piccolastic A-5, and additional toluene blend to obtain a uniform dispersion containing 12.5 parts calcined clay, 7.5 parts poly(vinyl butyral), 1.88 parts methoxymethylmelamine, 3.12 parts liquid polystyrene, 60 parts toluene and 15 parts ethanol. The pigment to binder ratio is 1:1, the poly(vinyl butyral) to methoxymethylmelamine ratio is 4:1 and the poly(vinyl-butyral) to polystyrene ratio is 2.4:1. The viscosity of the dispersion at 25° C. is 120 cps.

The dispersion is applied with a Meyer number 12 wire wound rod to the wire side of an electrically conductive paper stock sold by the James River Company under the trade designation J Stock, and is dried by passing the coated paper through an oven at 100° C. with a dwell time of about 60 seconds to provide a dry coated paper with about 8.0 g. of dry coating per sq. meter of recording material. The coated paper is subjected to the curl test. No curl is observed. The coating is readily dispersed in a toluene ethanol blend, showing that it has not been thermoset by the drying operation. The coated paper is stored for 16 hours at 22° C. and 50 percent relative humidity and is printed from a standard master at 50 percent relative humidity in a Minolta 101 Electrographic Copier. The print density determined with the Welch Scientific Company's Densichron Instrument using the black filter and standardized against the Reflection Standard No. 2 at a density of 0.505 is 1.27. The print density obtained on paper conditioned at 80 percent relative humidity for 16 hours is 1.29. The printed paper is subjected to a smear test by rubbing it with a finger and is rated 4 on a scale of 1 to 10 where 1 indicates that substantially no smear, finger printing or smudging occurred, 5 indicates that some smear but little finger printing occurred and 10 indicates that substantial smear and finger printing occurred.

The 50 percent RH paper is subjected to an adhesion test at 25° C. and 50 percent relative humidity and the print density is again measured. In the adhesion test, a strip of pressure sensitive adhesive tape sold under the tradename Scotch Magic Transparent Tape No. 810 by the 3M Company, is applied to the developed image by means of a 5 pound (2.27 kg), 4 inch diameter (10.16 cm) rubber roller and is then peeled at a 90° angle at a rate of about 10 inches (25.4 cm) per minute. The percent retention of density is calculated from the values before application of the tape and after its removal. The density retention in the tape test is 92 percent.

EXAMPLE 2

In contrast to Example 1 an equivalent dispersion (Example 2) prepared with additional poly(vinyl butyral) substituted from the alkoxyethylmelamine has a viscosity of 375 cps. and while it gives coatings which perform equivalently to Example 1 in the print tests and density retention test, the coatings exhibit 19 mm. of curl in the curl test.

EXAMPLES 3-6

A series of dispersions similar to the dispersion of Example 1 is prepared with various alkoxymethylmelamines (Examples 3-5) and an alkoxymethyl urea (Example 6) substituted for the alkoxymethylmelamine of Example 1. The ratios of combined formaldehyde to amino base and alkoxy to amino base are given in Table 1. Electrographic recording materials are prepared by coating the electroconductive paper support with the dispersions in the manner set forth in Example 1. The recording materials are subjected to print and curl tests and the data are presented in Table 1.

TABLE I

| | CURL AND DENSITY VALUES FOR POLY(VINYL BUTYRAL) COATINGS | | | | | |
|---|---|---|---|---|---|---|
| | Amino | Combined Ratio | | Density | | Curl |
| Example | Base | F | OR | 50% RH | 80% RH | mm |
| 1 | melamine | 5.6 | 5.3 | 1.27 | 1.29 | 0 |
| 2 | — | — | — | 1.32 | 1.35 | 19 |
| 3 | melamine | 5.5 | 3.0 | 1.30 | 1.21 | 0 |
| 4 | " | 5.6 | 5.4 | 1.10 | 1.01 | 2.5 |
| 5 | " | 3.6 | 2.7 | 1.29 | 1.04 | 0 |
| 6 | urea | 2.6 | 1.8 | 0.82 | 0.21 | 0 |

F = formaldyde
OR = alkoxy
In examples 1, 3, 5 and 6 R = Me.
In example 4, R = Bu.

The data show the excellent curl resistance of the electrographic recording materials prepared from dispersions containing alkoxymethylamino compounds (Examples 1 and 3-6) in comparison with the electrographic recording material prepared from a dispersion containing no alkoxymethylamino compound (Example 2). However, the print response of Example 6 containing the alkoxymethylurea is extremely poor particularly at 80 percent relative humidity. Furthermore, Example 4 containing butoxymethylmelamine while providing an adequate level of print density is generally inferior to the systems containing methoxymethylmelamines (Examples 1, 2 and 3) and Example 5 containing a methoxymethylmelamine with rather low formaldehyde:melamine and methoxy:melamine ratios demonstrates a greater decrease in density level at 80 percent humidity than Examples 1 and 3 which contain the more preferred methoxymethylmelamines.

EXAMPLE 7

Example 1 is repeated with glycerol substituted for the methoxymethylmelamine of Example 1. Satisfactory prints cannot be obtained at 50 percent relative humidity and indeed even when the glycerol content is reduced to 5% and 2.5% of the coating composition, satisfactory print behavior at 50 percent relative humidity is not obtained.

EXAMPLE 8

Example 1 is repeated with the methoxymethylmelamine substituted for the poly(vinyl butyral). The print density obtained with the electrographic recording material is 0.16 at 50 percent relative humidity and 0.18 at 80 percent relative humidity. This experiment shows that complete replacement of the poly(vinyl butyral) with methoxymethylmelamine gives unsatisfactory electrographic recording materials.

EXAMPLE 9

Example 1 is repeated with a dispersion containing poly(vinyl butyral) and methoxymethylmelamine in a 1:1 weight ratio. The electrographic recording material prepared from the dispersion is subjected to curl and print tests. The curl at 80 percent relative humidity is zero. The print density is 1.18 at 50 percent relative humidity and 0.89 at 80 percent relative humidity, demonstrating that some loss in dielectric performance occurs when the amount of methoxymethylmelamine is at the upper end of its range.

EXAMPLE 10

Example 1 is repeated with a poly(vinyl butyral) of weight average molecular weight 200,000, vinyl acetate content 1 weight percent and vinyl alcohol content 18 weight percent. The electrographic recording material shows zero curl at 80 percent relative humidity. The print density is 1.36 at 50 percent relative humidity and 1.32 at 80 percent.

EXAMPLES 11 AND 12

Examples 1 and 2 are repeated with poly(vinyl-acetal) in place of poly(vinyl butyral). The electrographic recording material of Example 11 containing methoxymethylmelamine gives 9.5 mm of curl at 80 percent humidity, 1.23 density level at 50 percent relative humidity and 1.20 at 80 percent. In contrast the electrographic recording material of Example 12 containing no methoxymethylmelamine curls excessively into a scroll at 80 percent humidity. Its print density is 1.28 at 50 percent relative humidity and 1.25 at 80 percent.

EXAMPLES 13 AND 14

Examples 1 and 2 are repeated with poly(vinyl propional) in place of poly(vinyl butyral). The electrographic recording material of Example 13 containing methoxymethylmelamine is free of curl at 80 percent humidity and prints to a density of 1.37 at 50 percent humidity and 1.35 at 100 percent humidity. In contrast, the electrographic recording material of Example 14 curls to form a scroll. Its print density is 1.36 at 50 percent humidity and 1.38 at 80 percent.

What is claimed is:

1. A coating composition comprising an intimate blend of from about 50 to about 90 parts by weight of a poly(vinyl acetal), from about 5 to about 40 parts by weight of an alkoxymethyl polyaminotriazine and from about 5 to about 30 parts by weight of an oligomer of styrene or α-methylstyrene of molecular weight in the range of about 300 to about 500.

2. The coating composition of claim 1 wherein the poly(vinyl acetal) is an interpolymer of a vinyl acetal, a $C_4$ to $C_{10}$ vinyl carboxylate and vinyl alcohol, of weight average molecular weight in the range of about 20,000 to about 500,000 comprising less than about 30 weight percent vinyl carboxylate units, and from about 5 to about 21 weight percent of vinyl alcohol units, and wherein the alkoxy methyl polyaminotriazine is a substantially methylolated polyaminotriazine substantially etherified with at least one $C_1$ to $C_{10}$ alcohol, wherein the degree of methylolation is in the range of about n:1 to about 2n:1 and the degree of etherification is in the range of about 0.8n to about 2n, where n is the number of amino groups per triazine ring.

3. The coating composition of claim 2 wherein the vinyl carboxylate is vinyl acetate.

4. The coating composition of claim 2 wherein the poly(vinyl acetal) is of weight average molecular weight in the range of from about 25,000 to about 250,000 and comprises from about 9 to about 18 weight percent vinyl alcohol units.

5. The coating composition of claim 2, 3 or 4 wherein the vinyl acetal is derived from formaldehyde, acetaldehyde, propionaldehyde or butyraldehyde.

6. The coating composition of claim 2, 3 or 4 wherein the poly(vinyl acetal) is poly(vinyl butyral).

7. The coating composition of claim 2, 3 or 4 wherein the alkyl group of the alkoxymethyl polyaminotriazine is methyl.

8. The coating composition of claim 7 wherein the polyaminotriazine is melamine.

9. The coating composition of claim 8 additionally comprising up to about 500 parts by weight of a finely divided pigment per 100 parts by weight of polymer blend.

10. The coating composition of claim 9 wherein the finely divided pigment is selected from the group consisting of silica, calcined clay, zinc oxide, zinc sulfide, titanium dioxide, talcum, barium sulfate, calcium carbonate, lithopone, and diatomaceous earth.

* * * * *